United States Patent [19]

Boudreau et al.

[11] 4,405,179
[45] Sep. 20, 1983

[54] UNIVERSAL VELOCIPEDE WHEEL

[75] Inventors: Robert J. Boudreau; Joel C. Cunard, both of Bedford, Pa.

[73] Assignee: Brown Group Recreational Products, Inc., Bedford, Pa.

[21] Appl. No.: 249,398

[22] Filed: Mar. 31, 1981

[51] Int. Cl.³ .............................................. B60B 37/00
[52] U.S. Cl. ................................ 301/2.5; 301/6 D; 301/63 PW; 301/73; 301/105 B
[58] Field of Search ............... 301/2.5, 6 D, 6 E, 6 V, 301/63 PW, 105 B, 73

[56] References Cited

U.S. PATENT DOCUMENTS

| | | | |
|---|---|---|---|
| 154,500 | 8/1874 | Margua | 301/2.5 |
| 902,383 | 10/1908 | Daugherty | 301/6 D |
| 1,460,811 | 7/1923 | Caleno | 301/6 D |
| 1,612,169 | 12/1926 | Bingham | 301/105 B |
| 2,227,232 | 12/1940 | Schwinn | 301/6 D |
| 3,158,404 | 11/1964 | Noakes | 301/2.5 |
| 4,280,736 | 7/1981 | Randman | 301/6 V |

FOREIGN PATENT DOCUMENTS 1240377 7/1971 United Kingdom ......... 301/63 PW

*Primary Examiner*—H. Grant Skaggs
*Attorney, Agent, or Firm*—Cesari and McKenna

[57] ABSTRACT

A wheel capable of being used as the front or rear wheel of a chain-driven velocipede or as the front wheel of a pedal-driven tricycle has a wheel rim whose hub is formed with an axial passage and an array of receptacles extending inward from the opposite ends of the hub. A pair of identical metal plates are positioned at opposite ends of the hub, each plate having a set of tabs aligned with the receptacles at the associated end of the hub and an axial opening which is in register with the passage through the hub. The two plates are clamped together with the wheel hub between them so that they rotate in unison with the wheel hub. When mounted on an axle, the wheel can function as a non-driven velocipede wheel. Also, pedal crank sections can be inserted through the axial plate openings into the opposite ends of the hub passage and secured to the plates so that the wheel can be used as the front wheel of a tricycle. Still further, a sprocket can be mounted to one of the plates so that the wheel can function as the chain-driven rear wheel of a velocipede.

6 Claims, 5 Drawing Figures

UNIVERSAL VELOCIPEDE WHEEL

This invention relates to velocipedes such as bicycles and tricycles. It relates more particularly to a wheel structure which can be used as both the front and rear wheels of a pedal-driven velocipede whether it is of the direct or chain-driven variety.

BACKGROUND OF THE INVENTION

Bikes and trikes, particularly the smaller more inexpensive ones designed to be used on the sidewalk, often employ wheels made primarily of plastic to minimize the cost of the wheels. Invariably, however, these wheels are all formed differently depending upon their locations on the velocipede. For example, in the direct-driven tricycle, the front wheel hub is specially shaped to receive a pedal crank. On the other hand, a chain-driven bicycle or tricycle has a front wheel whose hub is shaped to receive a simple axle, while the rear wheel of that velocipede has a hub which is arranged and adapted to accommodate a sprocket with or without a one-way clutch. Thus different molds or dies are required to form the different wheels used in those different applications and such wheels must be separately inventoried.

Furthermore, it is customary to offer these velocipedes in a knocked-down condition to minimize the amount of labor required by the manufacturer and also to minimize shipping and storage costs. To this end, the velocipedes are designed so that their component parts occupy a minimum amount of space in order to obtain the most favorable postage and delivery charges. However, the front wheel of a pedal-driven tricycle for example, by its very nature, occupies a relatively large amount of space due to the oppositely directed pedal cranks which project out on opposite sides of the front wheel. In fact, that front wheel may be the limiting factor on the thickness of the shipping carton containing a tricycle. Accordingly, the cost of shipping and handling the knocked-down pedal-driven velocipede is not as low as might be desired.

SUMMARY OF THE INVENTION

Accordingly, the present invention aims to provide a velocipede wheel structure which can be used as both the front and rear wheel of a chain-driven sidewalk bike and as the front wheel of a pedal driven tricycle.

Another object of the invention is to provide a velocipede wheel structure which minimizes the number of different parts which have to be manufactured and inventoried to assemble the various types of velocipede.

A further object of the invention is to provide a velocipede wheel structure which permits the front wheel of a pedal-driven tricycle to be shipped and stored in a knocked-down condition in a minimum amount of space.

Yet another object of the invention is to provide a velocipede wheel structure which can be shipped in a knocked-down condition and assembled easily by the average homeowner using conventional tools.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present wheel can function as the front wheel of a pedal-driven tricycle as well as the front or rear wheel of a chain driven bicycle or tricycle. The wheel is intended for use primarily on the small inexpensive bikes and trikes intended to be driven by small children on the sidewalk. To this end, the wheel can be rotatively secured to the front or rear fork of such velocipedes in the usual way.

The wheel comprises a spoked rim, which is a molded plastic part, whose hub is formed with an axial, shaft-receiving passage or bore. Spaced radially outward from the passage and within the hub is a circular array of axial passages extending inward from opposite ends of the hub so as to define pockets or recesses.

The wheel also includes a pair of reinforcing plates at opposite ends of the rim hub. Each reinforcing plate has a circular array of laterally extending tabs or tongues which are arranged and adapted to project into the hub recesses when the plates are positioned flush against the opposite ends of the hub. The interlocking engagements between the plate tabs and the hub recess walls rotatively lock the plates to the wheel rim. The plates have registering openings for receiving locking screws which are inserted through one plate, extend through the hub and engage in corresponding openings in the opposite plate. Nuts are turned down on the threaded ends of these screws to clamp the plates to the wheel rim hub.

The plates are also formed with axial openings which are in register with the axial passage through the wheel hub to permit a shaft or axle to be inserted through the plates into that passage. This basic wheel structure comprising the plastic rim, and the clamped-together plates allows the wheel to be used both as a pedal-driven tricycle front wheel, or the front or rear wheel of a sprocket-driven velocipede with or without a free-wheeling capability.

More particularly, when the wheel is used as the front wheel of a pedal-driven tricycle, the shaft of a pedal crank section is inserted through the axial opening in each wheel plate with the two crank sections being oriented 180° relative to one another about their common axis. Then each shaft is welded to its plate all around that opening. When the reinforcing plates are engaged on the opposite ends of the hub as described above, the crank section axles project into the opposite ends of the hub passage or bore. Thus when the plates are clamped together, the pedal crank sections are anchored firmly to the wheel rim so that they project out more or less perpendicular to the plane of that rim in the manner of a conventional pedal crank. However, before the reinforcing plates and associated pedal crank sections are attached to the wheel rim hub, they can repose parallel to one another in the plane of the wheel so that the wheel components occupy a minimum amount of space in a shipping carton or on the shelf.

If the present wheel is to be used as the front wheel of a bicycle, the pedal cranks are, of course, not attached to the reinforcing plates. Rather, the wheel is simply rotatively mounted on the front axle so that the axle projects through the registering openings in the plates and wheel rim hub, the usual washers and fasteners being provided on the ends of the axle to rotatively retain the wheel.

Still further, if the present wheel is to be used as the rear wheel of a chain-driven velocipede, a conventional metal sprocket is secured coaxially to one of the plates by appropriate means such as threaded fasteners. If necessary, an appropriate spacer may be provided between that plate and the sprocket to ensure that the sprocket adequately clears the velocipede fork to which the wheel is connected. The sprocket is connected by the usual chain to a pedal crank mounted to the velocipede frame so that the wheel rotates with the pedal crank. If desired, a one-way clutch can be incorporated into the sprocket so that the velocipede has a freewheeling capability.

Thus the basic wheel structure can be used in several different applications. With this in mind, the reinforcing plates are most desirably all formed with the same openings, enabling each plate to receive the necessary shafts and fasteners for all applications. In this way, the number of different parts required to be manufactured and maintained in inventory to provide all of the wheel requirements for bicycles and tricycles is kept to a minimum. This, in turn, minimizes overall manufacturing cost and also reduces the ancillary cost of supplying replacement parts for the different velocipedes.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENTS

Figure 1:
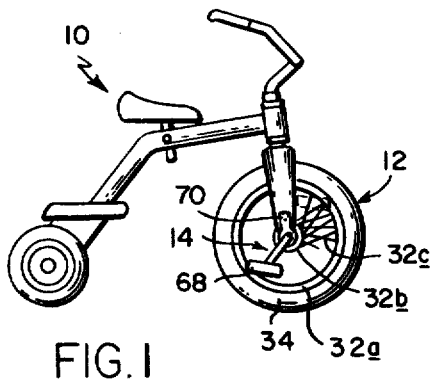
FIG. 1 is a perspective view of a tricycle employing a front wheel made in accordance with this invention.
Figure 2:
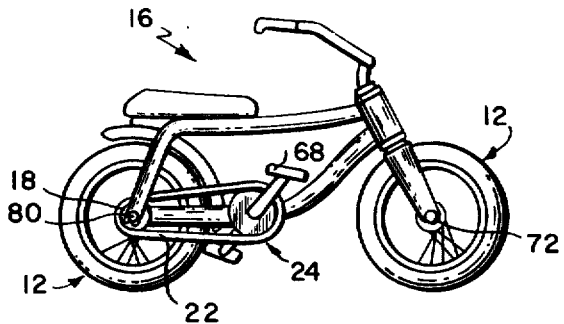
FIG. 2 is a similar view of a chain-driven sidewalk bike employing our wheels.

FIG. 1 shows a tricycle indicated generally at 10 which is fitted with a front wheel shown generally at 12 having a pedal crank 14 by which the rider can propel the tricycle. FIG. 2 illustrates the same basic wheel structure 12 functioning as both the front and rear wheels of a chain-driven bicycle indicated generally at 16. The rear wheel 12 is fitted with a sprocket 18 which is connected via a conventional bicycle chain 22 to a pedal sprocket 24 by which the rider propels the bicycle. All of the wheels 12 depicted in FIGS. 1 and 2 are made in exactly the same way and are completely interchangeable.

Figure 3:
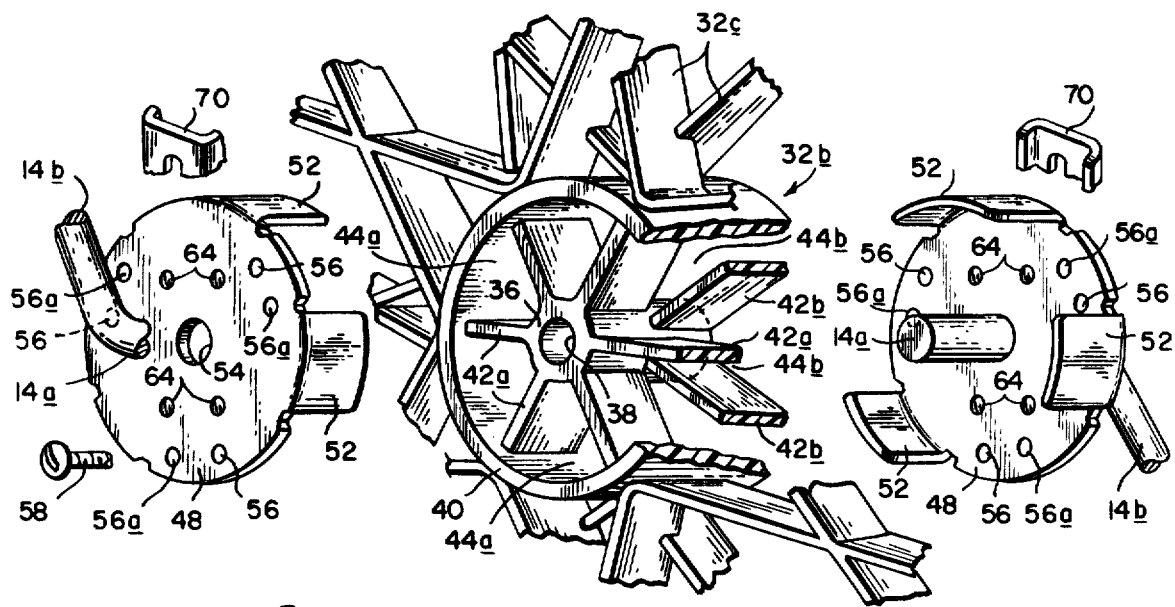
FIG. 3 is an exploded perspective view on a much larger scale with parts cut away showing the front wheel of the FIG. 1 tricycle in greater detail.
Figure 4:
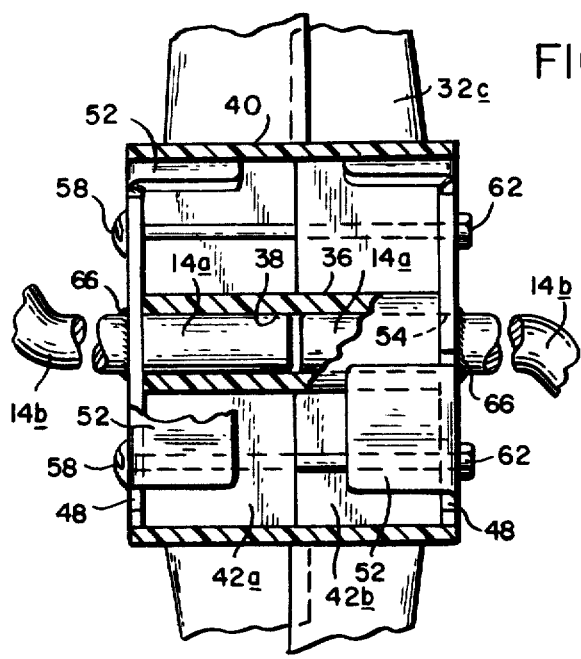
FIG. 4 is a fragmentary sectional view of that wheel.

Turning now to FIGS. 1, 3 and 4, the wheel 12 on the tricycle 10 comprises a wheel rim 32 having a circular peripheral rim 32a, and a hub 32b, the rim and hub being connected by an array of generally radial spokes 32c. The entire wheel rim 32 is preferably a unitary part molded of a suitable impact-resistant plastic such as polypropylene. A conventional rubber or plastic tire 34 is engaged around the rim.

Still referring to FIGS. 3 and 4, the wheel hub 32b is formed with a relatively small diameter tube 36 defining an axial, shaft-receiving passage or bore 38 extending the entire length of the hub. Spaced concentric to tube 36 is a larger diameter cylinder 40 which forms the outside wall of the hub 32b. The tube and cylinder are connected together by circular arrays of radial ribs or walls 42a and 42b located at opposite end segments of the hub. The two arrays of ribs are offset angularly from one another so that the ribs 42a and 42b intersect one another midway along the hub. This serves to reinforce the hub and makes a much stronger structure than would a single array of ribs extending the entire length of the hub.

The two arrays of ribs define two corresponding sets or arrays of wedge-shaped openings on receptacles 44a and 44b at the opposite ends of the hub, which sets of openings are displaced angularly relative to one another. Thus in the illustrated wheel, there are six ribs in each array and therefore six wedge-shaped, out-of-register openings at opposite ends of the hub.

The wheel 12 also includes a pair of discoid reinforcing plates 48, each plate having a circular array of tabs or tongues 52 projecting laterally from its periphery. Preferably, each plate 48 and its tabs 52 are formed integrally as a stamped metal part. The angular disposition of tabs 52 on each plate corresponds to the placement of the wedge-shaped openings 44a, 44b in the ends of hub 32b. Thus in the illustrated example, each plate has three such tabs, each of which is arcuate in cross-section to correspond to the curvature of the outer wall of hub openings 44a, 44b.

The plates 48 and their tabs 52 are dimensioned and adapted to permit the plates to be engaged over opposite ends of the hub 32b with the plate tabs 52 extending into the hub openings 44a and 44b. When the plates are properly seated in the hub, they are more or less coplanar with the ends of the hub, with the tabs 52 projecting almost to the center of the hub as best seen in FIG. 4. Furthermore, each plate is formed with an axial opening 54 which is in register with the hub passage 38 when the plates are seated as aforesaid. Thus when the plates are in place, a passage is provided all the way through the wheel.

Provision is also made for clamping the two plates 48 together on opposite ends of the wheel hub 32b. More particularly, a circular array of three openings 56 is formed in each plate 48. When the plates are seated on the hub, these openings in the plates are in line with openings 44a and 44b through the hub. Accordingly, screws 58 can be inserted through the passages 56 and along the hub openings with the threaded ends of the screws receiving appropriate threaded nuts 62 (FIG. 4).

As noted above, since the two arrays of hub openings 44a and 44b are displaced angularly relative to one another, the two plates 48 are likewise so displaced. Accordingly, to enable the plates 48 to be used interchangeably at either end of the hub, a second array of openings is provided which is displaced through the same angle relative to the first set. These openings are indicated in dotted lines at 56a in FIG. 3. Either the openings 56 or the openings 56a are utilized to secure each plate 48 depending upon which end of the hub it is secured to.

Also threaded openings 64 are formed in each plate 48 inboard of openings 56, 56a for reasons that will become apparent later. Suffice it to say at this point that the wheel rim 32 with tire 34 and clamped-together plates 48 comprise the basic wheel structure 12 which can be used in all of the applications described above.

To adapt the wheel 12 for use as the front wheel of a tricycle as shown in FIG. 1, prior to attaching each plate 48 to the hub, the free end segment 14a of a pedal crank section 14b is positioned in the opening 54 in that plate. With the crank axis oriented perpendicular to the plate, a weldment 66 (FIG. 4) is formed between the crank section and the plate all around opening 54, thereby securely anchoring the crank section to the plate. The usual pedal 68 (FIG. 1) is rotatively mounted to the free end of each crank section 14b.

Thus when plates 48 are seated in the opposite ends of hub 32b, the crank section end segments 14a extend a considerable distance into the hub passage 38 as shown in FIG. 4. It should be understood also that when the two plates 48 are seated, the two crank sections 14b are displaced angularly 180° relative to one another in the usual way. Thus when the plates are secured to the hub, the two crank sections 14b form the complete crank 14 illustrated in FIG. 1. The crank sections 14b can then be rotatively secured to the tricycle 10 front fork in the usual way by brackets 70.

When the wheel 12 is to be used as the front wheel of a bicycle as illustrated in FIG. 2, exactly the same wheel structure is provided except that the crank sections 14b are not installed on plates 48. Rather, the usual wheel axle or shaft 72 (FIG. 2) extends through the wheel passage formed by the plate openings 54 and the hub passage 38, the opposite ends of the axle being attached by nuts (not shown) in the usual way to the front fork of the bike 16 as illustrated in FIG. 2.

The very same wheel 12 can also be used as the rear wheel of a chain-driven bicycle or tricycle as illustrated in FIG. 2. In this event, a conventional metal sprocket 18 is secured to one of the plates 48 comprising the wheel. This securement is accomplished easily by means of screws 74 extending through appropriate openings in the sprocket and turned down into the aforementioned threaded openings 64 in plate 48. This anchors the sprocket to the wheel and enables the wheel to be rotated via the sprocket using the illustrated bicycle chain drive.

In some applications, it may be desirable to space the sprocket 18 axially away from the associated plate 48 so that the sprocket assuredly clears the bicycle frame. This is accomplished easily by means of a discoid spacer block 76 having substantially the same diameter as wheel hub 32b and formed with openings which register with the plate openings 54, 56, 56a and 64. Furthermore, sprocket 18 can either be a simple metal stamping or it can form part of a flat one-way clutch 181 of the type manufactured, for example, by Bendix Corporation.

Figure 5:
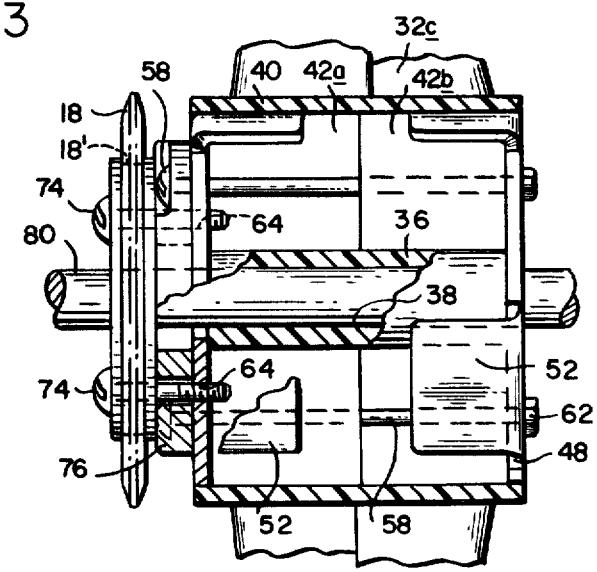
FIG. 5 is a similar view showing in greater detail the rear wheel employed on the FIG. 2 sidewalk bike.

When the wheel illustrated in FIG. 5 along with its sprocket 18 is attached to the rear fork of bicycle 16 by way of a rear axle 80 as illustrated in FIG. 2, it can be rotated in one or both directions through the chain drive 22, 24 depending upon whether or not the sprocket 18 includes the aforesaid one-way clutch.

It will be seen from the foregoing then, that my improved wheel structure simplifies both the manufacturing and inventorying of bicycle parts in that it permits the same basic wheel structure to be used in a plurality of applications. The wheel is composed of simple formed plastic and stamped metal parts. Therefore, the cost of the wheel is kept to a minimum, thereby reducing the overall cost of the velocipede to which the wheels are attached.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. A wheel capable of use as the front or rear wheel of a sprocket-driven velocipede as well as the front wheel of a pedal-driven tricycle, said wheel comprising
A. a unitary molded plastic wheel section composed of
 (1) a wheel rim,
 (2) a central hub, and
 (3) an array of spokes connecting the rim and hub, said hub including
  (a) an axle tube,
  (b) a second tube of appreciably larger diameter than the axle tube coaxially surrounding the axle tube, and
  (c) an array of ribs connecting the two tubes and defining therewith an array of passages extending axially through the hub between the tubes, and
B. a pair of flat, rigid plates positioned against the opposite ends of the axle tube, said plates having
 (1) unobstructed axial openings aligned with the opening through the axle tube and sized to snugly receive a rod that forms an axle or a rod that forms an axle or a pedal crank,
 (2) an outer diameter less than the inner diameter of the second tube and sized to be snugly received therein, and
 (3) a plurality of arcuate tabs projecting laterally from the faces of the plates at their peripheries into selected ones of said hub passages adjacent the junction of the second tube and the ribs defining those passages, and at least one of said plates having means to facilitate its connection to a sprocket, and
C. fastener means extending between the plates through selected ones of said hub passages for clamping the plates to the hub so that when the plates are rotated, torque is coupled by the plate tabs to the wheel section at locations spaced from the wheel axle and adjacent to the hub second tube.

2. The wheel defined in claim 1 wherein
A. the hub ribs extend radially between the two tubes defining a circular array of generally wedge-shaped passages, and
B. each plate is a discoid stamped metal part whose tabs are formed at the periphery of the plate.

3. The wheel defined in claim 2 and further including
A. a pedal crank section projecting through each axial opening in each plate into the hub, axle tube and
B. means for anchoring each pedal crank section to the wall of its associated plate opening so as to maintain the crank sections in axial alignment and 180° out of phase with one another.

4. The wheel defined in claim 2 and further including
A. a sprocket having a diameter larger than said hub and being positioned against one of said plates, and
B. a plurality of threaded fasteners extending through said sprocket and turned down into said threaded passages in said plate.

5. The wheel defined in claim 4 wherein said sprocket includes a one-way clutch which enables its toothed periphery to rotate in only one direction relative to said hub.

6. The wheel defined in claim 4 and further including spacer means positioned between said sprocket and the plate to which it is connected.

* * * * *